United States Patent Office 3,598,622
Patented Aug. 10, 1971

3,598,622
ALKALI TREATED STARCH COMPOSITIONS
Thomas Kearney Maher and Howard Paul Francis, La Grange Park, Ill., assignors to CPC International Inc.
No Drawing. Filed Feb. 19, 1969, Ser. No. 800,757
Int. Cl. C08b 25/02; D21h 1/22
U.S. Cl. 106—210
3 Claims

ABSTRACT OF THE DISCLOSURE

A method is described for producing an improved granular starch product which comprises suspending a bleached, oxidized, or anionic starch in an alkaline aqueous solution, acidifying the solution, and recovering an alkali treated starch product. The use of the improved starch product produced as described above as a wet end additive, a coating color binder, and a size in the manufacture of paper is disclosed. Also revealed is the lowering of the peak viscosity during gelatinization which is attained when bleached or oxidized starch is alkali treated prior to gelatinization.

---

This invention describes a method for alkali treating certain starch derivatives to improve their properties for use as coating color binders, sizes, and wet end additives in the paper manufacturing process.

The starch industry is continually searching for methods of improving starch products so as to develop new uses for these products and to improve their utilization in present uses. For example, if an anionic starch, such as for example a carboxyalkyl starch, or a phosphate or sulfate ester of starch, could be treated simply and economically so as to improve its properties as a wet end additive, to thereby impart dry strength properties to paper by addition to paper pulp, the end uses of the anionic starch would be thus expanded by this improved utility.

It would also be particularly beneficial if a bleached or oxidized starch could be treated so as to reduce the peak viscosity which is exhibited by slurries of said starch when it is gelatinized in water solution by the application of heat. If this could be accomplished, the amount of agitation which must be applied to starch slurries during the gelatinization process could be greatly reduced. This would allow the use of a smaller, less powerful, and less expensive stirring apparatus with a concurrent reduction in the original cost of said apparatus and in the cost of the power supplied for operating said apparatus.

In addition, a lowering in peak viscosity of unmodified bleached starch solutions would allow the formulation of starch solutions for acid or enzyme thinning containing higher starch concentrations than are now treatable in acid and enzyme thinning (hydrolyzing) procedures. An additional advantage would be realized if enzyme thinning of starch could be speeded up through more efficient use of enzyme when the starch has first been alkali treated.

Another particularly advantageous and beneficial improvement in the properties of bleached and oxidized starch would be a marked lowering of the coating color viscosity of said starch when used in coating color applications. To increase throughput in the paper making process, paper makers are continually increasing coater speeds. This, in turn, requires a coating composition with a relatively high total solids content and with less water to evaporate. Yet, this leads to a problem of excessive viscosity particularly imparted to the coating composition by the relatively high solids content of the utilized starch binder. The viscosity of the coating color is thus increased to the point where the coating composition becomes impractical to use as such or as a minimum detriment causes uneven coating, extreme difficulty in application, etc. In some cases, to counteract this problem of excess viscosity, starches have been extensively modified to the point where the film forming and water holding properties as well as adhesive strength have been extensively reduced.

It would therefore be an advance in the art if a bleached or oxidized starch could be simply and economically treated whereby the treated starch product would not exhibit excessive viscosity in water and yet where it also would not even partially lose some of the desired properties sought when employed as a paper size or as a binder in paper coating compositions. If a method of treating bleached and oxidized starch were known which produced a treated granular bleached or oxidized starch, solutions of which exhibited relatively low viscosity and yet which still showed good utility as a paper size or as a binder in a coating color composition the thus treated bleached or oxidized starch product would be a distinct improvement over the prior art bleached or oxidized starch. Such a proposed treatment would be even more attractive if it were simple and practical to carry out from a commercial standpoint.

It therefore becomes the principal object of this invention to provide a method of treating an anionic starch so that said anionic starch will exhibit improved properties as a wet end additive when added to paper during the wet end period of the paper manufacturing process.

A further principal object of the invention is to provide a method of reducing the peak viscosity exhibited by bleached and oxidized starch when it is being gelatinized by being slurried in an aqueous solution and heated.

A still further principal object of the invention is to provide a method for treating a bleached or oxidized starch so that a paper size or a coating color composition formulated utilizing this starch as the size or coating color binder will exhibit markedly lowered viscosity.

A further object of the invention is to provide an alkali treated anionic starch product usable as a wet end additive.

A still further object of the invention is to provide an alkali treated bleached or oxidized starch product usable as a paper size or as a coating color binder.

A further object yet of the invention is to provide a method for alkali treating starch whereby the above objects may be attained.

Other objects will appear hereinafter.

In accordance with the invention, an alkali treatment of bleached, oxidized, and anionic starch has been discovered which improves the properties of said starch for various end uses. Broadly speaking, the process of the invention comprises the step of first forming an aqueous slurry of the granular starch in an alkaline solution, then acidifying the slurry and recovering the improved granular starch product.

The bleached, oxidized, and anionic starch advantageously treated by this procedure may be derived from any vegetable source such as, for example, corn, wheat, potato, tapioca, rice, sago, and grain sorghum. The waxy starches may also be used. The term "starch" is used broadly herein used broadly herein and encompasses unmodified starch and tailings and as well, starch that has been modified by treatment with acids, enzymes, heat, etc. Soluble or partially soluble modified starches, cationic and antionic starches, dextrins, pregelatinized products and starch derivatives of different types are also suitable in the process.

Bleaching of starch is defined as an oxidative treatment of the starch which leads to a marked whitening of the starch. Generally, the severity of the oxidative treatment is controlled so that the carotene, xanthophyll, and related pigments naturally occurring in the starch are efficiently oxidized to colorless compounds while the starch product is only slightly oxidized (D.S.≦0.1 as later defined) if at all. Bleaching may be carried out either in a dry state or in solution and a wide variety of oxidizing agents may be employed, the only restrictive requirement being that the oxidizer chosen must be mild enough under the chosen reaction conditions so that the starch will not be excessively attacked and the oxidizer must be strong enough so that the pigments will be effectively oxidized. Examples of usable bleaching agents include, but are not limited to, chlorine, bromine, hypochlorite, hypobromite, permanganate, ozone, chlorites, and chlorities in combination with persulfates. Methods of bleaching starch are discussed in more detail in Chemistry and Industry of Starch, second edition, R. W. Kerr, editor, Academic Press, Inc., New York, N.Y. 1950.

Oxidation of starch is defined as an oxidative treatment of the starch which leads to chemical changes in the starch. For example, oxidation of primary alcohol groups to carboxyl groups, of aldehyde groups to carboxyl groups, of secondary alcohol groups to ketone groups, and of glycol groups to carboxyl groups. The oxidation of starch leads to a starch product which is more easily solubilized and which exhibits a lower viscosity when solubilized in water. Oxidation may be carried out by utilizing any of a number of oxidizing agents. Often the oxidizing agents used to form oxidized starch are the same agents that are used to bleach starch. Harsher reaction conditions such as higher temperature, longer contact times, different pH, etc., are used to cause these agents to attack the starch molecules. Reagents used in the oxidation of starch include, but are not limited to, air, bleaching powder, halogens, chloramines, chloric acid, chlorates, chlorine dioxide, chromic acid, ferric-chloride, hydrogen peroxide, hypochlorite, manganese dioxide, nitric acid, nitrogen dioxide, perborates, periodic acid, persulfates, potassium dioxide, potassium permanganate, silver oxide, p-toluene sulfochloramide and zinc oxide. Methods of oxidizing starch are also disclosed in more detail in the previously cited text, Chemistry and Industry of Starch.

The repeating anhydroglucose units in starch may have different degrees of substitution (D.S.) from one to three and starch derivatives are generally categorized in terms of their D.S. In a given quantity of a starch derivative, there will generally be some anhydroglucose units that are not substituted at all (D.S.,0), together with other anhydroglucose units that have different degrees of substitution, from 1 to 3. A statistical average is employed to characterize the average D.S. of the entire quantity, although the figure is ordinarily stated as the D.S. rather than the average D.S. The bleached, oxidized or anionic starch derivative treated according to this invention may have a varying range of D.S. (carboxyl or anionic substitution) which may be as little as 0.0001, up to the maximum level of 3.0. Irrespective of the number of molecules of starch which are reacted, or the actual sequence of substitution, or the number of anhydroglucose units involved, the general formula is intended to represent products where the substitution may occur to various degrees of substitution at all or less than all anhydroglucose units in all or less than all starch molecules.

Sulfate esters of starch may be formed in a variety of ways. Direct treatment of starch with concentrated sulfuric acid is effective but leads to extensive degradation. Organic sulfur trioxide complexes will sulfate starch under mild-non-degrading conditions. The preferred starch sulfating system is a solution of sulfur trioxidetriethylamine in dimethylformamide.

Phosphate esters of starch are made by reacting starch with phosphorus pentoxide, sodium tripholyphosphate, mixtures of sodium mono- and dihydrogen orthophosphates and the like. Extensively phosphated esters of starch may also be obtained by reacting the starch with $\beta$-cyanoethyl phosphate and dicyclohexylcarbodiimide in pyridine.

Carboxyalkyl starch (more specifically a sodium carboxyalkyl ether of starch) is generally made by reacting a salt of an $\alpha$-halo carboxylic acid with starch. Alternatively, carboxyalkyl starch may be prepared by reacting an $\alpha$–$\beta$ unsaturated carboxylic acid with starch.

The production of sulfate and phosphate esters of starch and of carboxyalkyl anionic starch derivatives is discussed in detail in Starch: Chemistry and Technology, volumes 1 and 2, R. L. Whistler and E. F. Paschall, Editors, Academic Press, New York and London, 1965 and 1967.

The alkaline starch slurry may be formulated in any convenient manner. For example, the starch may be suspended in an alkaline solution. Alternatively, a starch slurry may be formulated at a neutral or acid pH and a base, either in the form of a solution or as a solid, may be added until the desired pH is reached. In a still different manner, the starch, base, and liquid may be simultaneously contacted to form a resultant alkaline starch slurry.

The pH of the alkaline starch slurry during treatment is preferably above about 10 and below the pH at which the starch will paste. Most preferably, the pH during treatment falls within the range from about 10 to about 12. Preferred bases include alkali metal and quaternary ammonium hydroxides such as sodium, potassium, lithium, and ammonium hydroxides. Sodium hydroxide and potassium hydroxide are the most preferred hydroxides.

The temperature of the slurry must be adjusted to fall above its freezing point and below the gelatinization temperature of the starch in the slurry. Preferably, the temperature is adjusted to fall within the range from about 10° C. to about 60° C. Most preferably, the temperature is allowed to fall within the range of from about 15° C. to about 35° C. by performing the treatment at ambient indoor temperature.

Preferably, the slurry is allowed to stand for a time falling within the range from about a few seconds to about 24 hours. Most preferably, the slurry is allowed to stand for a time falling within the range from about 5 minutes to about 2 hours.

The aqueous alkaline slurry is then acidified through the addition of acid. Preferably, the pH is adjusted to fall within the range from about 4.5 to about 8. Acids which may be used include, but are not limited to, sulfuric acid, hydrochloric acid, phosphoric acid, and acetic acid. Hydrochloric acid and phosphoric acid are the preferred acids.

The starch is separated from the slurry by any convenient method such as, for example, flash drying, centrifugation, filtration, and the like, and is washed with water to remove impurities such as salt.

The alkali treated bleached or oxidized granular starch product of this invention is characterized by a lowered viscosity as measured by the Scott method and a 10% to 45% reduction in peak viscosity on solubilization as measured by a Brabender apparatus. When the solubilization is performed in the presence of alpha amylase enzyme the reduction in peak viscosity is considerably larger and falls within the range from about 35% to about 60%.

The granular anionic starch compositions treated as described herein may very advantageously be used to treat paper by adding them directly to the paper pulp. Paper pulp and alkali treated anionic starch compositions are first mixed at the wet end of the paper manufacturing process, for example, the addition may be made as desired to the beater itself or alternately, to the chest, Jordan discharge line, screen or headbox. Usually, prior to addition of materials of this type, the pH of the pulp is adjusted downward. Carboxyalkyl starch is the preferred anionic starch and carboxymethyl starch is the preferred carboxyalkyl starch.

Useful paper coating compositions using the alkali treated bleached or oxidized starch typically comprise a mixture of water with clay or another inert inorganic metallic pigment and an alkali treated bleached or oxidized starch binder made in accordance with this invention. A dispersing agent such as sodium hexametaphosphate, trisodium polyposphate, tetrasodium pyrophosphate or the corresponding potassium salts is often added. Moreover, an alkaline material such as sodium hydroxide, ammonium hydroxide, or various other alkaline salts or hydroxides of alkali metals can also be present. The dispersing agent together with the alkaline material serves to disperse the pigment. The alkaline material also aids in adjusting the pH to the desired value for the coating application which frequently is about pH 8. If desired, various other additives such as antifoaming agents and preservatives can also be added.

When employed as a binder, the granular alkali treated, bleached or oxidized starch must first be gelatinized or solubilized, that is, the starch must be first cooked in water or heated to the gel point temperature of the starch. The solubilization step is normally carried out on the starch alone, although the coating composition may be first formulated and then the starch gelatinized in the presence of pigment.

The pigment portion of the coating slip may be chosen from a wide variety of inorganic metallic pigments such as clay, talc, titanium dioxide, blanc fixe, powdered tin, precipitated chalk, satin white, ground limestone, etc. Preferred, due to ready availability and relatively low cost, is clay.

The amounts of the various substituents of the coating preparation are naturally strongly dependent upon the type and amount of alkali treated, bleached or oxidized starch, the type of inorganic pigment, process of application of the coating, as well as the specific properties desired in the finally coated paper. Generally speaking, the coating color has a solids content falling within the range from about 20% to about 70% including an amount of one or more of the above discussed inorganic pigments falling within the range from about 30% to about 60% based on solids and an amount of the alkali treated starch binder of the invention falling within the range from about 5% to about 30% based on solids. The above percentage figures are expressed in weight percent. It is understood, of course, that other known binders including additional modified and unmodified starch binders may be used along with the alkali treated bleached or oxidized starch binder materials herein defined without departing from the scope of the invention.

The actual introduction of a new coating preparation described herein in treating paper can be carried out in a variety of ways. Thus, for example, one may use coating members such as an air knife, application roll, a bar wrapped with a wire, a trailing blade and a sealing press.

Bleached hydroxyalkyl starch, preferably bleached hydroxyethyl or hydroxypropyl starch, is particularly useful as a binder in paper coating compositions.

Alkali treated bleached or oxidized starch may also be used advantageously as sizes for paper. In this application, a starch solution is fed onto paper, generally as the paper is passed through rollers. Generally, the starch solution contains an amount of starch falling within the range from about 1% to about 25% based on total solution weight. After drying, the paper surface is greatly reduced in fuzziness.

The granular alkali treated, bleached or oxidized starch of this invention exhibits a truly outstanding characteristic during gelatinization procedures since the peak viscosity, i.e., the highest viscosity reached during the gelatinization procedure for the alkali treated bleached or oxidized starch, is much lower than the peak viscosity reached by otherwise identical non-alkali treated bleached or oxidized starch. Thus, solutions of starch of higher solids content can be formulated.

The term "peak viscosity" is well known in the starch field. It is defined as the highest viscosity attained when a starch is solubilized through application of heat. To determine the peak viscosity of a particular starch, a slurry of the starch is made in water and the slurry is heated at a constant rate. The viscosity of the solution is continually determined, for example, by using a Brabender viscometer or its equivalent and a graph is made of viscosity versus either time or temperature. Below the solubilization temperature of the starch, the viscosity will remain relatively constant. As the solubilization temperature of the starch is reached, a sharp spike will occur in the graph as the starch molecules absorb water and the starch granules swell and begin to burst. The viscosity of the solution will then begin to drop as more and more of the starch molecules become gelatinized. In practice, high peak viscosities are extremely troublesome in that they require that the slurry be agitated by powerful stirring motors or the like. The occurrence of a high peak viscosity also limits the total solids load of starch which can be obtained in solution since the solution should preferably remain fluid and stirrable even at the peak point of the viscosity.

Bleached starch which is otherwise unmodified, may be advantageously alkali treated prior to being thinned by acid-thinning or enzyme thinning techniques. The advantage lies in the fact that a higher percent of solids of the bleached starch may be suspended in solution prior to solubilization because the peak viscosity of the starch during the solubilization procedure has been substantially reduced by the alkali treatment. Utilizing the alkali treatment technique, acid thinned and enzyme thinned starch may be produced in higher yields as calculated on the basis of weight of starch converted per unit volume of solution. Thus, lesser quantities of water need be heated and handled to produce a given quantity of acid thinned or enzyme thinned starch. In addition, enzyme thinning proceeds more rapidly on alkali treated starch than on non-alkali treated starch.

The following examples will illustrate the practice of this invention. These examples are meant to be illustrative and the invention, of course, is not to be limited thereto. All percentage figures are in weight percent unless otherwise specifically stated.

EXAMPLE 1

Alkali treated anionic carboxyalkyl starch as a wet end additive

The effect of alkali treating carboxymethyl starch upon the strength of paper handsheets made utilizing this anionic starch as a wet end additive has been evaluated. Cationic starch was also evaluated with the same paper pulp for comparison purposes.

All starches described as alkali treated in this end subsequent examples were subjected to the following treatment:

(1) Slurried in water at room temperature.
(2) Sodium hydroxide added to give a pH of about 11.5 and held with slow stirring at room temperature for 30 minutes.
(3) Hydrochloric acid added to give a pH of about 6.5.
(4) Slurry filtered and washed with water three times.
(5) Product air dried.

The starch was used as a wet end additive as follows. First, the starch was solubilized by forming a 3% by weight solids solution in water and heating to 95° C. for 30 minutes. The resulting solution was diluted to 0.5% by weight solids by adding water and the diluted starch solution was added to the paper pulp slurry. Paper handsheets were made from the resulting paper pulp suspension. When pigment retention was to be measured, 10% by weight of titanium dioxide based on total pulp weight was added and dispersed into the pulp slurry before addition of the diluted starch solution. Bursting strength (Mullen points), tensile strength, and titanium dioxide retention was measured by TAPPI (Technical Association of the Pulp and Paper Industry, 360 Lexington Ave., New York, N.Y. 10017) methods T 403 ts-63, 2404 ts-66, and T 439 m-60, respectively. The data is summarized in Table I.

TABLE I.—PAPER HANDSHEETS

Strengthening—0.5% starch by weight based on pulp

| Starch additive | D.S. | Scott viscosity, gm./sec. | Alkali treatment | Mullen points | Tensile strength, kg./15 mm. | Percent TiO₂ retention |
|---|---|---|---|---|---|---|
| Blank | | | | 14.5 | 3.4 | |
| Cationic starch | | | | 19.5 | 3.9 | |
| Carboxymethyl | 0.03 | 9/41 | No | 16.0 | 3.5 | |
| Do | 0.03 | | Yes | 18.5 | 3.9 | |
| Do | 0.06 | 9/45 | No | 15.0 | 3.4 | |
| Do | 0.06 | | Yes | 19.0 | 3.9 | |

Pigment retention—0.5% starch by weight and 10% TiO₂ by weight based on pulp

| | | | | | | |
|---|---|---|---|---|---|---|
| Blank | | | | 15.0 | 3.7 | |
| Blank plus TiO₂ | | | | 12.0 | 3.2 | 42 |
| Cationic starch | | | | 14.5 | 3.4 | 68 |
| Carboxymethyl | 0.06 | 9/45 | No | 13.5 | 3.4 | 38 |
| Do | 0.06 | | Yes | 16.5 | 3.5 | 57 |

The results indicate definite improvements in the strength of paper handsheets when a starch additive used in formulating the paper handsheets is an anionic carboxyalkyl starch which has been first alkali treated. Increased titanium dioxide retention is called exhibited when the starch has been first alkali treated.

EXAMPLE 2

Effect of alkali treatment upon coating color properties

The coating color Brookfield viscosity in centipoise of a solution made up containing 18 parts starch to 100 parts clay and diluted to 60% solids was determined for bleached hydroxethyl starch both after 2 hours and after 24 hours of aging. The alkali treatment was performed as described in Example 1. The results of this testing are listed in Table II.

TABLE II.—COATING COLOR VISCOSITY

| | Age 2 hour hydroxyethyl starch | | Age 24 hour hydroxyethyl starch | |
|---|---|---|---|---|
| R.p.m. | As is (#6 spindle) | Alkali treated (#4 spindle) | As is (#6 spindle) | Alkali treated (#4 spindle) |
| 10 | 18,100 | 3,780 | 19,200 | 4,840 |
| 20 | 10,300 | 2,440 | 11,200 | 3,220 |
| 50 | 5,200 | 1,460 | 5,640 | 1,900 |
| 100 | 3,200 | 1,040 | 3,500 | 1,350 |
| 50 | 4,800 | 1,380 | 5,300 | 1,880 |
| 20 | 8,950 | 2,170 | 9,700 | 3,030 |
| 10 | 15,300 | 3,160 | 16,200 | 4,580 |

The very sizable reduction in coating color viscosity observed when the bleached hydroxyethyl starch utilized in the color coating has first been alkali treated is especially surprising in view of the fact that when the paste viscosity of a 32.5% solids solution of the same starch was determined, it was found that the alkali treatment led to a slight increase in the final paste viscosity. Table III summarizes the data which was obtained when the paste viscosity of a 32.5% solids solution of the same starch both with and without alkali treatment was determined.

TABLE III

Hydroxyethyl starch, 150° F., #3 Spindle ᵃ
(32.5% D.S. paste)

| | Centipoise | |
|---|---|---|
| R.p.m. | As is | Alkali treated |
| 10 | 450 | 640 |
| 20 | 450 | 630 |
| 50 | 457 | 640 |
| 100 | 497 | 637 |
| 50 | 515 | 680 |
| 20 | 560 | 770 |
| 10 | 600 | 830 |

ᵃ As is: paste pH—6.0; alkali treated: paste pH—6.3.

EXAMPLE 3

Effect of alkali treatment on peak viscosity

The peak viscosities observed during solubilization of a series of alkali treated and non-alkali treated starches were determined. The non-alkali treated starches served as controls. The peak viscosity was determined by the standard Brabender method which is described, for example, in Viscosity and Flow Measurement, pp. 170–177, J. R. Van Wazer, J. W. Lyons, K. Y. Kim, and R. E. Colwell, Interscience Publishers, a division of John Wiley and Sons, New York, 1963.

The peak viscosities of the starches were measured by suspending the starch at the solids level shown in water and heating at a rate of 1.5° C. per minute while constantly measuring the Brabender viscosity of the slurry at a spindle speed of 75 r.p.m.

Table IV, parts A and B summarize the data obtained.

TABLE IV

Part A

| Starch | Alkali treated | Percent solids | Peak viscosity (Brabender units) |
|---|---|---|---|
| Bleached corn | No | 8.0 | 510 |
| Do | Yes | 8.0 | 410 |
| Oxidized corn | No | 16.0 | 760 |
| Do | Yes | 16.0 | 450 |
| Do | No | 26.0 | 720 |
| Do | Yes | 26.0 | 440 |
| Bleached acid-modified red and white milo | No | 35.0 | 620 |
| Do | Yes | 35.0 | 470 |
| Do | No | 35.0 | 190 |
| Do | Yes | 35.0 | 150 |
| Bleached acid-modified hydroxyethyl corn | No | 18.0 | 1,220 |
| Do | Yes | 18.0 | 990 |
| Do | No | 24.0 | 1,330 |
| Do | Yes | 24.0 | 1,160 |

Part B

| Starch | Alkali treated | Percent solids | Peak viscosity (Brabender units) |
|---|---|---|---|
| Unmodified corn | No | 7.0 | 500 |
| Do | Yes | 7.0 | 590 |
| Acid-modified corn | No | 32.0 | 305 |
| Do | Yes | 32.0 | 335 |
| Unmodified potato | No | 4.0 | 790 |
| Do | Yes | 4.0 | 1,000 |
| Acid-modified hydroxyethyl corn | No | 18.0 | 770 |
| Do | Yes | 18.0 | 790 |
| Do | No | 18.0 | 360 |
| Do | Yes | 18.0 | 360 |
| Acid-modified hydroxypropyl corn | No | 18.0 | 1,030 |
| Do | Yes | 18.0 | 1,240 |

The results indicate that alkali treatment of bleached starch and of oxidized starch effects a considerable reduction in the peak viscosity of slurries of the starch during the solubilization procedure (Table IV, part A). It is also shown that the alkali treatment is ineffective in accomplishing this objective upon starch which has not been bleached or oxidized (Table IV, part B). Also demonstrated is the fact that bleached and oxidized starch which is also acid modified will have lower peak viscosity when alkali treated by the method of this invention. In addition, the data demonstrates that hydroxyethyl corn starch which has been bleached or oxidized and also acid modified exhibits a lower peak viscosity after alkali treatment, whereas, an essentially identical hydroxyethylated corn starch which has not been bleached or oxidized, does not exhibit a lower peak viscosity after an identical alkali treatment.

The percent decrease in peak viscosity, and the changes in Scott viscosity and in fluidity observed upon alkali treatment of several of the bleached and oxidized starches listed in Table IV were also determined. The data is summarized in Table V.

specific measuring device used, the torque was reported in millivolts. The graph of torque versus time obtained generally resembled those obtained utilizing a Brabender apparatus. Table VI summarizes the results of this test.

TABLE V

| Starch | Scott viscosity (gm./sec.) | | Fluidity | | D.S. carboxyl | Percent solids | Percent decrease in peak Brabender viscosity when alkali treated |
|---|---|---|---|---|---|---|---|
|  | Untreated | Treated | Untreated | Treated |  |  |  |
| Bleached corn | 15/92 | 15/52 | 7 | 7 | .1 | 8 | 20 |
| Bleached acid-modified hydroxyethyl corn | 50/46 | 50/42 | 69 | 71 | .1 | 18 | 19 |
| Do | 75/54 | 75/52 | 79 | 82 | .1 | 24 | 13 |
| Oxidized corn | 35/46 | 35/34 | 78 | 77 | .4 | 16 | 41 |
| Do | 75/52 | 75/45 | 84 | 85 | .5 |  |  |
| Do |  |  | 90 | 89 | .6 | 26 | 39 |

The data clearly demonstrate that the percent decrease in peak viscosity is dependent on the carboxyl content of the starch. Also shown is a consistent reduction in Scott viscosity resulting from the alkali treatment. It has been additionally demonstrated that alkali treated bleached and oxidized starches are characterized by their exhibition of 13% to 41% decreases in peak viscosity when compared to the parent starch.

EXAMPLE 4

Enzyme conversion of alkali treated bleached starch

This example demonstrates the effect of alkali treating bleached starch upon the peak viscosity exhibited by the starch during enzyme conversion procedures.

Two samples of bleached, but otherwise unmodified corn starch, were divided into separate sub-portions. One sub-portion of each bleached corn starch was then alkali treated as described in Example 1. The other sub-portion of each bleached corn starch was not alkali treated. 178 grams of each sub-portion of starch was individually suspended in 622 grams of water and 0.267 grams of alpha amylase enzyme and 0.178 gram of calcium carbonate was added to each solution. The pH of each solution was then adjusted to 7.2 by addition of hydrochloric acid or additional calcium carbonate as was necessary. The enzyme was added and the solution was stirred slowly for 30 minutes. Steam was injected into the paste for 10 minutes until the temperature of the solution reached 77° C. This temperature was maintained for 30 minutes by heating the vessels in which the solutions were contained with steam. At the end of this time, the temperature was raised to 96° C. in 10 minutes and held at that temperature for 1 hour to inactivate the enzyme. The viscosities of the solutions were constantly determined throughout the above procedure. A peak viscosity was attained during the time the solutions were heated from ambient temperature to 77° C. This peak viscosity occurred after about 9 minutes of heating.

Viscosity was determined by measuring the torque needed to agitate the solution at a constant speed. In the

TABLE VI

| Starch | Alkali treated | Percent solids | Peak (mv.) |
|---|---|---|---|
| Bleached corn starch | No | 19.8 | 35 |
| Do | Yes | 19.8 | 24 |
| Do | No | 19.7 | 44 |
| Do | Yes | 19.5 | 32 |

The data demonstrates that alkali treatment of bleached starch leads to a reduction in the peak viscosity exhibited by the bleached starch during enzyme conversion procedures typically utilized to produce enzyme thinned starch. The lowered peak viscosity attained makes possible the loading of a higher percent of solids in solution prior to solubilization and enzyme thinning. Thus, higher yields of thinned starch, based on weight of starch converted per unit volume of solution handled, may be obtained. Also, higher solids content slurries may be formulated.

EXAMPLE 5

Effect of alkali treatment upon Brabender viscosity during enzyme conversion

The effect of alkali treatment upon the peak viscosity of bleached corn starch with a carboxyl D.S. of 0.1 was also determined at several solids levels and enzyme concentration utilizing a Brabender viscosity apparatus. The data are summarized in Table VII.

TABLE VII

| Brabender peak viscosity | | Percent decrease | pH of alkali treatment | Percent solids | Treatment conditions | |
|---|---|---|---|---|---|---|
| Untreated | Treated |  |  |  | Enzyme content, percent | Temperature, ° C. |
| 170 | 100 | 41 | 10.6 | 10 | 0.15 | 96. |
| 1,350 | 560 | 59 | 10.6 | 20 | 0.10 | 77/30 min. then 96/30 min. |
| 2,640 | 1,150 | 56 | 10.6 | 16 | .17 | 77/30 min. |
| 2,720 | 1,750 | 36 | 10.5 | 16 | .17 | 77/30 min. |
| 2,720 | 1,700 | 38 | 10.6 | 16 | .17 | 77/30 min. |
| 2,720 | 1,675 | 38 | 11.0 | 16 | .17 | 77/30 min. |

It is apparent from the data that bleached starch when alkali treated is characterized by the exhibition of 36% to 59% decrease in peak viscosity during enzyme conversion when compared to the parent starch.

EXAMPLE 6

Effect of alkali treatment upon efficiency of enzymolysis

The amount of enzyme conversion obtained in a set time period was determined for both alkali treated and non-alkali treated bleached starch. Measurement of the Brookfield viscosity of the thinned starch was used as a measure of the amount of conversion obtained. A lower Brookfield viscosity indicates more complete conversion. The results are summarized in Table VIII.

TABLE VIII

| Brookfield viscosity | | Percent solids | Enzyme content, percent | Treatment conditions Heated at 1.5° C./min. to temperature, ° C., time, min. |
|---|---|---|---|---|
| Untreated | Treated | | | |
| 14 [1] | [1] 12 | 10 | .15 | 96° C./30 min. |
| 97 [2] | [1] 36 | 20 | .10 | 77° C./30 min. then 96° C./30 min. |
| 14 [1] | [1] 11 | [3] 10 | .10 | 77° C./min. then 96° C./min. |

[1] #1 spindle.  [2] #2 spindle.  [3] Dilution of solution immediately above.

The data indicate that alkali treatment prior to enzyme conversion leads to faster thinning of bleached starch.

An advantage obtained by alkali treating anionic starch by the method of this invention is that the alkali treatment improves the pigment retention properties of the anionic starch. The thus treated starch finds application as a wet end additive in the manufacture of paper. Paper made using anionic starch which has been alkali treated by the method of this invention shows improved physical strength and pigment retention over the same starch which has not been alkali treated.

Bleached or oxidized starch when treated by the method of this invention is greatly improved in that it will exhibit a much lower peak viscosity during solubilization or pasting. This decrease in peak viscosity is also noted when the solubilization or pasting takes place while the starch is being enzyme converted. Since enzyme conversion of starch is often performed just prior to the utilization of the starch in papermaking operations, the lowering of the peak viscosity of the starch solution during this enzyme thinning operation allows the paper manufacturer to operate with lower power equipment since not as much power is needed to stir the paste slurry during the enzyme conversion process.

A second important advantage exhibited by granular bleached or oxidized starch which has been alkali treated by the method of this invention, is that coating colors made utilizing the alkali treated bleached or oxidized starch as a binder will have a far lower viscosity than similar coating colors made utilizing the same bleached or oxidized starch which has not been alkali treated. This lowered coating color viscosity allows the paper manufacturer to operate at a much faster rate of throughput of paper and allows increased production volume per paper manufacturing facilities.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention.

We claim:

1. A method of improving the strength of paper which comprises adding to the paper pulp from which paper is manufactured, at the wet end, an improved anionic starch product, solubilized by enzyme conversion, and produced by a process comprising:
   suspending a granular anionic starch in an aqueous alkaline slurry at a pH within the range from about 10 to about 12, and at a temperature above the freezing point of the slurry and below the gelatinization temperature of the starch and within the range from about 10° C. to about 60° C., for from about 5 minutes up to about 24 hours, to modify it; then
   acidifying the slurry to a pH in the range from about 4.5 to about 8, then
   separating the treated starch from the slurry and recovering the improved granular starch product.

2. A paper coating composition comprising a suspension in an aqueous liquid, at a solids content falling within the range from about 20% to about 70% of an amount of an inorganic pigment falling within the range from about 30% to about 60% and an amount of an improved starch product, solubilized by an enzyme conversion, falling within the range from about 5% to about 30%, said pigment and starch percentages each being expressed as weight percent based on total solids present and said starch product being produced by a process comprising
   suspending a granular starch selected from the group consisting of bleached starch, oxidized starch, and anionic starch, in an aqueous alkaline slurry at a pH within the range from about 10 to about 12, and at a temperature above the freezing point of the slurry and below the gelatinization temperature of the starch and within the range from about 10° C. to about 60° C., for from about 5 minutes up to about 24 hours, to modify it; then
   acidifying the slurry to a pH in the range from about 4.5 to about 8, then
   separating the treated starch from the slurry and recovering the improved granular starch product.

3. A paper sizing composition comprising an aqueous liquid having solubilized therein, by an enzyme conversion, an amount of an improved starch product falling within the range from 1% to about 25% based on total weight of the liquid plus the starch, said starch product being produced by a process comprising:
   suspending a granular starch selected from the group consisting of bleached starch, oxidized starch, and anionic starch, in an aqueous alkaline slurry at a pH within the range from about 10 to about 12, and at a temperature above the freezing point of the slurry and below the gelatinization temperature of the starch and within the range from about 10° C. to about 60° C., for from about 5 minutes up to about 24 hours, to modify it; then
   acidifying the slurry to a pH in the range from about 4.5 to about 8, then
   separating the treated starch from the slurry and recovering the improved granular starch product.

References Cited

UNITED STATES PATENTS

| 2,373,016 | 4/1945 | Daly et al. | |
| 3,066,035 | 11/1962 | Albert | 106—24 |
| 3,255,040 | 6/1966 | Huber et al. | 127—32 |
| 3,355,307 | 11/1967 | Schoenberger | 106—213 |
| 3,436,305 | 1/1969 | Maher | 162—175 |

OTHER REFERENCES

Sloan, J. W.: Properties of Periodate Oxidized Starch, July 1956, pp. 1165–1172, Industrial and Engineering Chemistry.

LORENZO B. HAYES, Primary Examiner

U.S. Cl. X.R.

106—213, 214; 117—156; 162—175